(12) United States Patent
Kang

(10) Patent No.: US 12,175,064 B2
(45) Date of Patent: Dec. 24, 2024

(54) DEVICE HAVING A FOLDING SCREEN AND ITS IMAGE PROCESSING METHOD

(71) Applicant: VIVO MOBILE COMMUNICATION CO., LTD., Dongguan (CN)

(72) Inventor: Xiong Kang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/373,273

(22) Filed: Sep. 26, 2023

(65) Prior Publication Data

US 2024/0028186 A1     Jan. 25, 2024

Related U.S. Application Data

(63) Continuation of application No. PCT/CN2022/082971, filed on Mar. 25, 2022.

(30) Foreign Application Priority Data

Mar. 30, 2021 (CN) .......................... 202110343944.9

(51) Int. Cl.
*G06F 3/14*           (2006.01)
*G06F 3/04845*     (2022.01)
(Continued)

(52) U.S. Cl.
CPC ...... *G06F 3/04845* (2013.01); *G06F 3/04886* (2013.01); *G06F 3/1446* (2013.01);
(Continued)

(58) Field of Classification Search
CPC ............. G06F 3/04845; G06F 3/04886; G06F 3/1446; G06F 3/1454; G06F 3/147;
(Continued)

(56) References Cited

U.S. PATENT DOCUMENTS

| | | | |
|---|---|---|---|
| 10,410,400 B1 | 9/2019 | Aksit et al. | |
| 2010/0060548 A1* | 3/2010 | Choi | G06F 3/04886 |
| | | | 345/1.3 |

(Continued)

FOREIGN PATENT DOCUMENTS

| | | |
|---|---|---|
| CN | 108475110 A | 8/2018 |
| CN | 108563383 A | 9/2018 |

(Continued)

OTHER PUBLICATIONS

International Search Report issued in corresponding International Application No. PCT/CN2022/082971, mailed Jun. 8, 2022, 6 pages.

(Continued)

*Primary Examiner* — Adam J Snyder
(74) *Attorney, Agent, or Firm* — IPX PLLC

(57) ABSTRACT

An image processing method, an electronic device, and a non-transitory computer-readable storage medium are provided. The method is performed by an electronic device having a folding screen and includes: when a first image is displayed on the folding screen, receiving a first folding operation performed by a user on the folding screen. The method further includes processing the first image in response to the first folding operation, to obtain a target image. The method also includes displaying the target image on the folding screen.

17 Claims, 10 Drawing Sheets

(51) Int. Cl.
*G06F 3/04886* (2022.01)
*G06F 1/16* (2006.01)
*G06F 3/147* (2006.01)
*G06F 9/451* (2018.01)

(52) U.S. Cl.
CPC .......... *G06F 1/1641* (2013.01); *G06F 1/1652* (2013.01); *G06F 1/1677* (2013.01); *G06F 3/1454* (2013.01); *G06F 3/147* (2013.01); *G06F 9/451* (2018.02); *G06F 2203/04803* (2013.01); *G09G 2354/00* (2013.01)

(58) Field of Classification Search
CPC .......... G06F 9/451; G06F 2203/04803; G06F 1/1641; G06F 1/1652; G06F 1/1677; G09G 2354/00
See application file for complete search history.

(56) References Cited

U.S. PATENT DOCUMENTS

| | | | | |
|---|---|---|---|---|
| 2014/0049464 | A1* | 2/2014 | Kwak | G06F 3/0487 345/156 |
| 2015/0286288 | A1* | 10/2015 | Lee | G06F 3/147 345/173 |
| 2016/0048170 | A1* | 2/2016 | Kim | G06F 3/0487 345/173 |
| 2016/0063297 | A1* | 3/2016 | Lee | G06F 1/1652 382/124 |
| 2020/0126519 | A1 | 4/2020 | Heo | |

FOREIGN PATENT DOCUMENTS

| | | |
|---|---|---|
| CN | 109597553 A | 4/2019 |
| CN | 109769089 A | 5/2019 |
| CN | 109842722 A | 6/2019 |
| CN | 111953902 A | 11/2020 |
| CN | 111986570 A | 11/2020 |
| CN | 112333333 A | 2/2021 |
| CN | 112965681 A | 6/2021 |
| CN | 113741775 A | 12/2021 |
| WO | 2019184947 A1 | 10/2019 |

OTHER PUBLICATIONS

First Office Action issued in related Chinese Application No. 202110343944.9, mailed Mar. 8, 2022, 8 pages.

Extended European Search Report issued in related European Application No. 22778769.4, mailed Jul. 19, 2024, 9 pages.

* cited by examiner

DEVICE HAVING A FOLDING SCREEN AND ITS IMAGE PROCESSING METHOD

CROSS-REFERENCE TO RELATED APPLICATIONS

This application is a continuation of International Application No. PCT/CN2022/082971, filed on Mar. 25, 2022, which claims priority to Chinese Patent Application No. 202110343944.9, filed on March 30. The entire contents of each of the above-referenced applications are expressly incorporated herein by reference.

TECHNICAL FIELD

This application pertains to the field of image processing, and in particular, to an image processing method, an image processing apparatus, an electronic device, and a readable storage medium.

BACKGROUND

With rapid development of a mobile terminal, the mobile terminal has many functions such as communication and photographing. The photographing function is frequently used in daily life. In various scenarios, a user may record a current scenario by photographing an image, and then processing the image to perform social sharing Currently, a finger is mainly used to perform a touch operation on a screen to perform related processing on an image. In this manner, operation efficiency is low and user experience is poor because precision is not high.

SUMMARY

Embodiments of this application aim to provide an image processing scheme.

This application is implemented as follows:

According to a first aspect, an embodiment of this application provides an image processing method. The method is applied to an electronic device having a folding screen and includes.

in a case that a first image is displayed on the folding screen, receiving a first folding operation performed by a user on the folding screen;

processing the first image in response to the first folding operation, to obtain a target image; and displaying the target image on the folding screen.

According to a second aspect, an embodiment of this application provides an image processing apparatus. The apparatus is applied to an electronic device having a folding screen and apparatus includes:

a first receiving module, configured to: in a case that a first image is displayed on the folding screen, receive a first folding operation performed by a user on the folding screen;

a first processing module, configured to process the first image in response to the first folding operation, to obtain a target image; and a display control module, configured to display the target image on the folding screen.

According to a third aspect, an embodiment of this application provides an electronic device. The electronic device includes a processor, a memory, and a program or an instruction that is stored in the memory and that can be run on the processor, where when the program or the instruction is executed by the processor, the steps of the method in the first aspect are implemented.

According to a fourth aspect, an embodiment of this application provides a readable storage medium. The readable storage medium stores a program or an instruction, and when the program or the instruction is executed by a processor, the steps of the method in the first aspect are implemented.

According to a fifth aspect, an embodiment of this application provides a chip. The chip includes a processor and a communication interface, the communication interface is coupled to the processor, and the processor is configured to run a program or an instruction to implement the method in the first aspect.

In the embodiments of this application, in a case that a first image is displayed on a folding screen, the first image is processed in response to a first folding operation performed by a user on the folding screen, to obtain a target image, and the target image is displayed on the folding screen. Foldability of the folding screen is used in an image processing process, thereby helping the user more conveniently and accurately process an image and improving user experience.

DETAILED DESCRIPTION

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

In the specification and claims of this application, the terms "first", "second", and the like are intended to distinguish between similar objects but do not describe a specific order or sequence. It should be understood that the data used in such a way is interchangeable in proper circumstances so that the embodiments of this application can be implemented in an order other than the order illustrated or described herein. In addition, in the specification and the claims, "and/or" represents at least one of connected objects, and a character "/" generally represents an "or" relationship between associated objects.

With reference to the accompanying drawings, an image processing scheme provided in the embodiments of this application is described in detail by using embodiments and application scenarios.

The solutions in the embodiments of the present disclosure are applied to an electronic device having a folding screen. The folding screen in the embodiments of the present disclosure may be a folding screen on which a hinge or a rotating shaft is disposed, and the folding screen may be opened or folded along the rotating shaft or the hinge. The folding screen in the embodiments of the present disclosure may be a flexible screen that may be folded along any direction of the folding screen.

Figure 1:
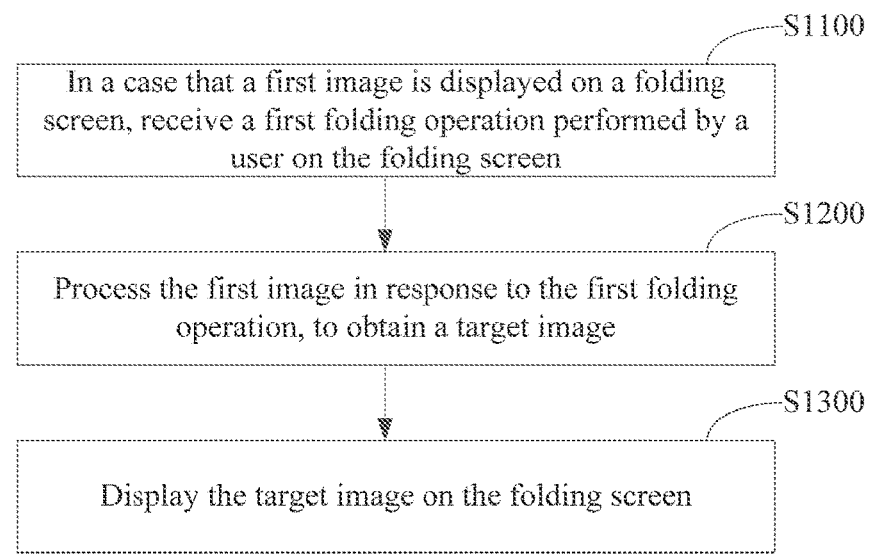
FIG. 1 is a flowchart of an image processing method according to an embodiment of this application.

As shown in FIG. 1, an embodiment of the present disclosure provides an image processing method, applied to an electronic device having a folding screen. The method includes the following steps:

S1100. In a case that a first image is displayed on the folding screen, receive a first folding operation performed by a user on the folding screen.

In an example, the first folding operation may be a folding operation along a hinge or a rotating shaft of the folding screen. In an example, the first folding operation may be a folding operation along a midline of the folding screen.

S1200 Process the first image in response to the first folding operation, to obtain a target image.

In an example, the processing the first image to obtain a target image may be performing copy processing on the first image to obtain the target image. In an example, the processing the first image to obtain a target image may be performing mirroring processing on the first image to obtain the target image. In an example, the processing the first image to obtain a target image may be performing magnification processing on the first image to obtain the target image.

S1300. Display the target image on the folding screen.

In an example, in S1300, only the target image is displayed on the folding screen. In an example, in S1300, the folding screen is divided into a first sub-screen and a second sub-screen, and the first image and the target image are displayed on different sub-screens of the folding screen.

According to this embodiment of this application, in a case that a first image is displayed on a folding screen, the first image is processed in response to a first folding operation performed by a user on the folding screen, to obtain a target image, and the target image is displayed on the folding screen. Foldability of the folding screen is used in an image processing process, thereby helping the user more conveniently and accurately process an image and improving user experience.

In an embodiment, to facilitate separate editing processing performed by a plurality of users on images, in a case that the first image is displayed on the folding screen, a second image is further displayed on the folding screen. The second image is an image obtained by performing copy processing or mirroring processing on the first image.

In this embodiment, mirroring processing is performed on the first image in response to the folding operation performed by the user along the midline of the folding screen, to obtain the second image, and the folding screen is divided into the first sub-screen and the second sub-screen along the midline of the folding screen. The first image and the second image are symmetrically displayed on different sub-screens of the folding screen by using the midline of the folding screen as a symmetric line, so that two images with a mirroring effect are presented on the folding screen. In this way, space of the folding screen can be fully used, and subsequently images can be separately edited by a plurality of persons.

Figure 2:
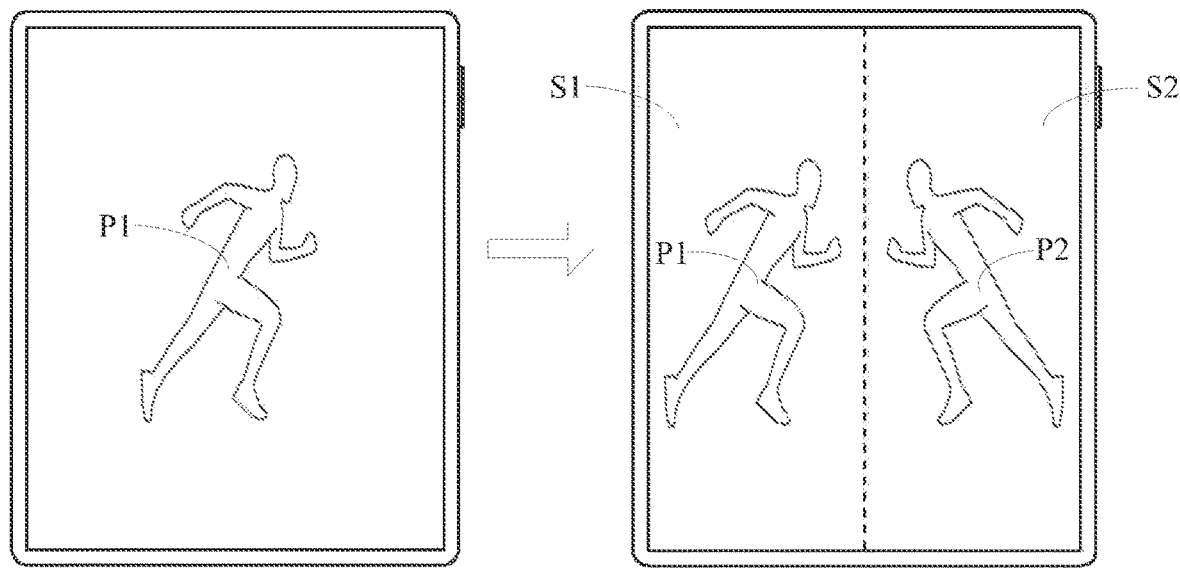
FIG. 2 is a first schematic diagram of an interface of a folding screen according to an embodiment of this application.

As shown in FIG. 2, a first image P1 is displayed on the folding screen. The user performs a folding operation on the folding screen along the midline of the folding screen, and performs mirroring processing on the first image P1 in response to the folding operation, to obtain a second image P2. The folding screen is divided into a first sub-screen and a second sub-screen along the midline of the folding screen, and the first image P1 and the second image P2 are symmetrically displayed on different sub-screens of the folding screen. For example, the first image P1 is displayed on a left sub-screen S1 and the second image P2 is displayed on a right sub-screen S2, or the first image P1 is displayed on a right sub-screen S2, and the second image P2 is displayed on a left sub-screen S1.

Figure 3:
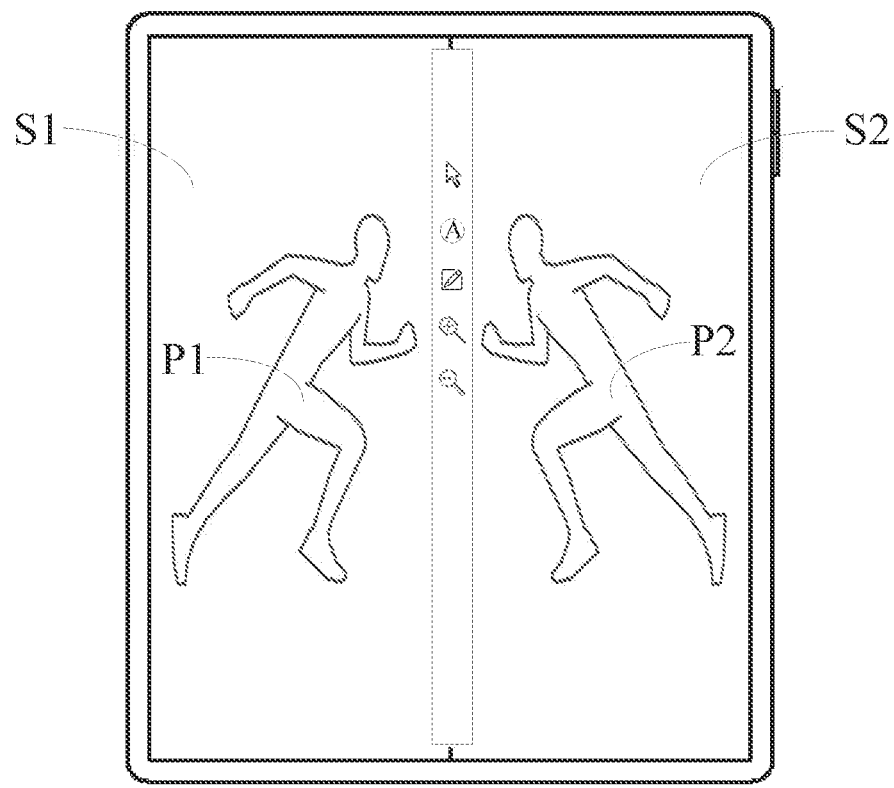
FIG. 3 is a second schematic diagram of an interface of a folding screen according to an embodiment of this application.

In an example, as shown in FIG. 3, when the first image and the second image are displayed on different sub-screens of the folding screen, a toolbar may be displayed on the midline of the folding screen, and a common image processing tool may be displayed on the toolbar. For example, an arrow-style image processing tool is used to select a specific region in an image, an image processing tool marked with a letter "A" is used to add a character in the image, a pen-shaped image processing tool is used to draw a line in the image, an image processing tool marked with "+" is used to perform magnification processing on the image, and an image processing tool marked with "−" is used to perform scaling processing on the image. The toolbar is displayed on the midline of the folding screen, so that the user can select an image processing tool to process an image, thereby increasing image processing efficiency without affecting normal display of the image.

In an example, the toolbar supports an up and down sliding operation, and in response to the up and down sliding operation performed by the user on the toolbar, the toolbar may present a new image processing tool, thereby further facilitating the user and improving image processing efficiency.

Figure 4:
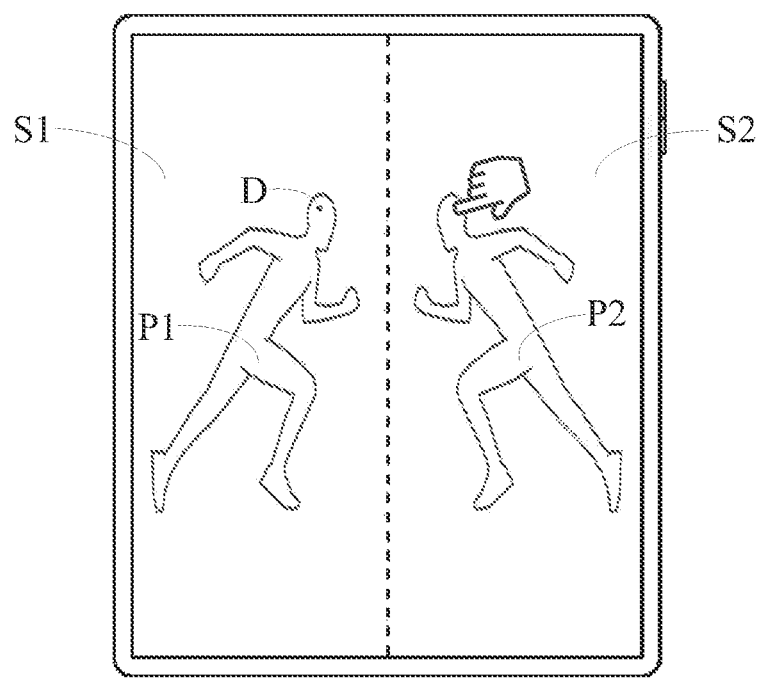
FIG. 4 is a third schematic diagram of an interface of a folding screen according to an embodiment of this application.

After the first image and the second image are displayed on different sub-screens of the folding screen, if the user touches an image on any sub-screen by using a finger or a stylus, a touch point is obtained and the touch point is mapped to another sub-screen. For example, as shown in FIG. 4, when the user touches the second image P2 displayed on the right sub-screen S2, a touch point is obtained, and the touch point D is correspondingly displayed at a corresponding position of the first image P1 on the left sub-screen S1. In this way, the user can see a current touch point on an image on the left sub-screen S1, and perform an image editing operation on the right sub-screen S2 at the touch point position. In this manner, the touch point can be accurately determined even if there is occlusion of the finger or the stylus, thereby improving accuracy and convenience of image processing. In addition, when an image processing operation is performed on the second image P2 on the right sub-screen S2, an operation effect may be mapped to the first image P1 on the left sub-screen S1, so that the user can view the operation effect on the left sub-screen, and a display effect panorama can be viewed even if there is occlusion of the finger or the stylus.

In this embodiment of the present disclosure, processing related to modification of image content is considered as editing processing, for example, clipping processing, mosaic processing, toner processing, text or expression addition processing, and content removal processing on an image. Processing that is not related to modification of image content is considered as non-editing processing, for example, moving processing, scaling processing, and magnification processing on an image.

In an embodiment, after the first image and the second image are displayed on different sub-screens of the folding screen, when an image on the first sub-screen is in an edited state, in response to editing processing performed by the user on an image on the second sub-screen, synchronous editing processing is performed on the image on the first sub-screen and the image on the second sub-screen. After the first image and the second image are displayed on different sub-screens of the folding screen, when an image on the first sub-screen is in an edited state, in response to a moving or scaling operation performed by the user on an image on the second sub-screen, synchronous moving or scaling processing is performed on the image on the first sub-screen and the image on the second sub-screen.

That is, the second sub-screen may be used to move or scale an image, and an effect of the moving or scaling processing is mapped to the first sub-screen. The first sub-screen may be used to perform editing processing on the image, and a modification effect is mapped to the second sub-screen. Therefore, one sub-screen is used to move or scale an image, and another sub-screen is used to perform editing processing on the image, thereby facilitating the user and greatly improving image processing efficiency.

Again, as shown in FIG. 3, when the user selects a brush tool to modify an image, the second image P2 enters an editing state by default. In this case, if the user wants to move the second image P2 to move a to-be-modified region to the middle of the right sub-screen S2 for modification, the user does not need to cancel the brush tool first, but performs a moving operation on the first image P1 on the left sub-screen S1 and maps an effect of the moving operation to the right sub-screen S2, so that the to-be-modified region in the second image P2 is moved to the middle of the right sub-screen S2, thereby saving an operation of the user and improving image processing efficiency and user experience.

In an embodiment, in a case that a second image is further displayed on the folding screen, before the receiving a first folding operation performed by a user on the folding screen, the method may further include the following steps:

S2100. Select a first image region on the first image in response to a selection operation performed by the user on the first image: and select a second image region on the second image in response to a selection operation performed by the user on the second image, where image content corresponding to the first image region is different from that corresponding to the second image region.

There may be one or more first image regions, and there may be one or more second image regions. The image content of the first image region is different from that of the second image region.

S2200. Modify the first image region in response to a modification operation performed by the user on the first image region, to obtain a modified first image; and modify the second image region in response to a modification operation performed by the user on the second image region, to obtain a modified second image.

After S2200, the processing the first image in response to the first folding operation, to obtain a target image may include merging the modified first image and the modified second image in response to the first folding operation, to obtain the target image.

The first folding operation may be, for example, a folding operation along a midline of the folding screen.

In this embodiment, the user may select one or more first image regions on the first image, and select one or more second image regions on the second image, where image content of the first image region is different from that of the second image region. Then, a plurality of users may separately perform modification operations on different image regions. After the modification operations of the plurality of users are completed, a folding operation is performed on the folding screen along the midline of the folding screen, so that all modifications of the plurality of users can be merged to obtain a finally modified image, that is, the target image. In this manner, the plurality of users jointly participate in image editing processing, thereby greatly reducing a time required for image modification and improving image processing efficiency and user experience.

Figure 5:
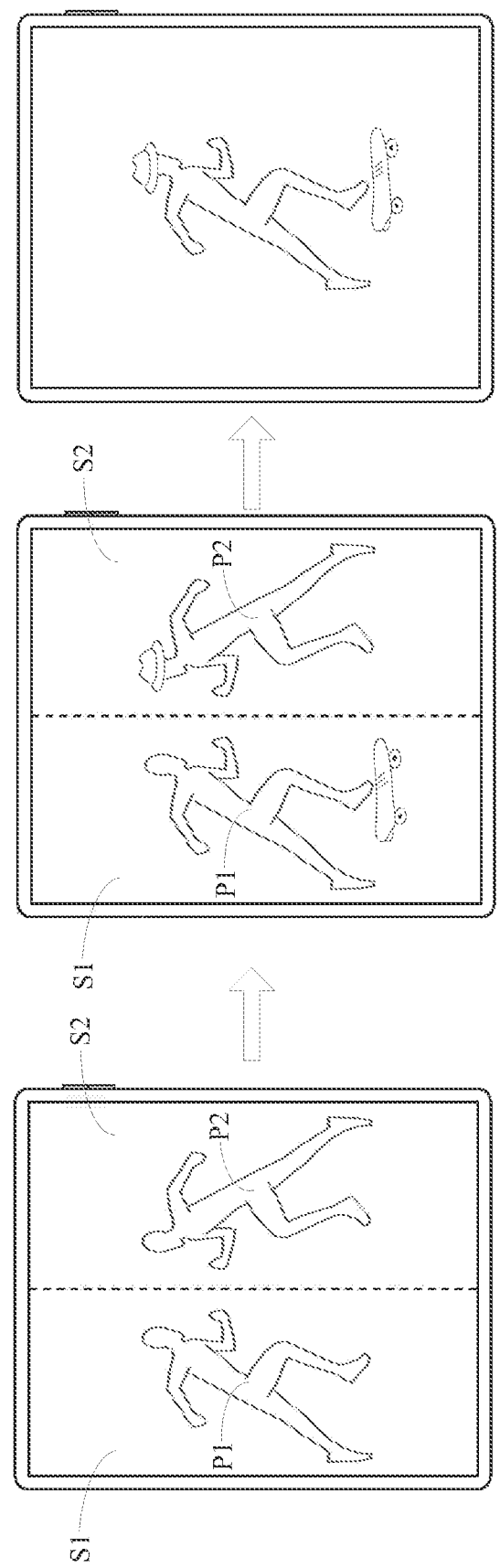
FIG. 5 is a fourth schematic diagram of an interface of a folding screen according to an embodiment of this application.

For example, as shown in FIG. 5, a foot region of a character is selected on the first image P1, and a head region of a character is selected on the second image P2. A first user modifies the foot of the character on the first image P1 (for example, adds a skate board), and a second user modifies the head of the character on the second image P2 (for example, adds a hat). After the first user and the second user complete the modification, the first folding operation is performed on the folding screen, so that these modifications can be merged to obtain a finally modified target image to be displayed on the folding screen.

In an embodiment, a second image is further displayed on the folding screen, and the second image is an image obtained by performing copy processing or mirroring processing on the first image. Before the receiving a first folding operation performed by a user on the folding screen, the method may further include the following steps.

S3100 Select a merged region and a locked region on the first image in response to a selection operation performed by the user on the first image.

The merged region may be selected by the user and may be merged and modified, and there may be one or more merged regions. The locked region may be selected by the user and cannot be merged or modified, and there may be one or more locked regions. The user may select the merged region and the locked region as required, for example, the user may use a determined modified part as a locked region and another part as a merged region. This is not limited in this embodiment of this application.

S3200. Obtain a modified second image in response to a modification operation performed by the user on the second image.

After S3200, the processing the first image in response to the first folding operation, to obtain a target image may include: merging image content of a third image region of the modified second image into the first image in response to the first folding operation, to obtain the target image, where the third image region is an image region corresponding to the merged region in the modified second image.

That is, only a modification result of the image region corresponding to the merged region in the second image is brought to the final target image, and a modification result of an image region corresponding to the locked region in the second image is not brought to the final target image. In this way, not only a plurality of users can jointly participate in image modification and editing to improve an image processing effect, but also a merged region and a locked region may be selected according to an actual requirement of different users, to selectively merge a modified image, so that a determined part of the user is avoided to be modified again. In addition, efficiency of image processing is improved, and a requirement of different users can be met and an operation is more convenient.

In this embodiment, when a plurality of persons perform editing, the first user and the second user may separately perform selection operations on the first image and the second image, and then may merge the image content of the second image into the first image or may merge the image content of the first image into the second image. In this way, a processing manner is more flexible, and different target images may be obtained according to settings of different users, thereby meeting different user requirements.

Taking the first image and the second image shown in FIG. 5 as an example, the first user selects a head region of a character on the first image P1 as a merged region, and selects a foot region of a character on the first image P1 as a locked region. The first user modifies the foot of the character on the first image P1 (for example, adds a skate board), and the second user modifies the head of the character on the second image P2 (for example, adds a hat). After the first user and the second user complete the modification, the first image is selected as a merged image, and in response to a folding operation along the midline of the folding screen, image content of a modified third image region (the head region) of the second image is merged into the first image to obtain the target image, that is, the target image includes a hat and a skate board.

Figure 6:
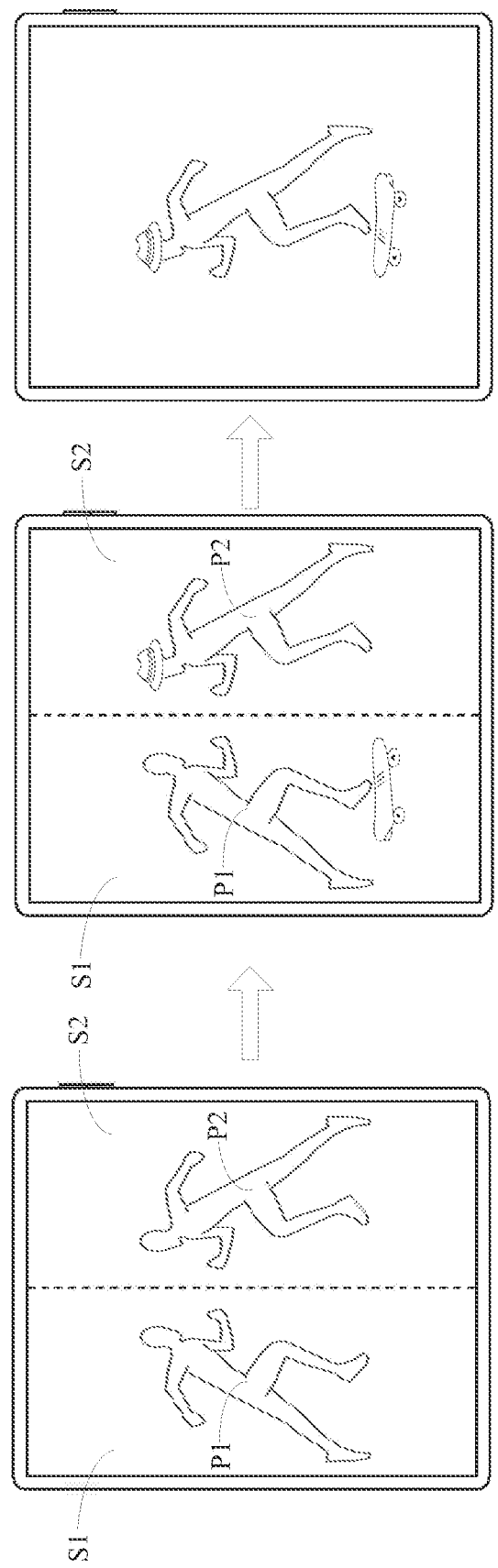
FIG. 6 is a fifth schematic diagram of an interface of a folding screen according to an embodiment of this application.

Taking the first image and the second image shown in FIG. 6 as an example, the second user selects a foot region of a character on the second image P2 as a merged region, and selects a head region of a character on the second image P2 as a locked region. The first user modifies the foot of the character on the first image P1 (for example, adds a skate board), and the second user modifies the head of the character on the second image P2 (for example, adds a striped hat). After the first user and the second complete the modification, the second image is selected as a merged image, and in response to a folding operation along the midline of the folding screen, image content of a modified third image region (the foot region) of the first image is merged into the second image to obtain the target image, that is, the target image includes a striped hat and a skate board.

In an embodiment, the folding screen includes a first screen region for displaying the first image and a second screen region other than the first image. The first folding operation is a folding operation in which a folding line passes through a target image region, and the processing the first image to obtain a target image includes: performing magnification processing on the first image to obtain the target image; and the displaying the target image on the folding screen includes: displaying, on the second screen region, at least a region that is on the target image and that is corresponding to the target image region.

In this embodiment, the folding screen includes the first screen region for displaying the first image and the second screen region other than the first image. In other words, the first image is displayed only in a partial region of the folding screen, and the second screen region other than the first image is a blank region, that is, no content is displayed in the second screen region.

The target image region may be an image region in which the user performs an editing operation, or the target image region may be an image region preselected by the user. This is not limited in this embodiment.

In an implementation, the user performs the first folding operation on the folding screen, where the first folding operation is the folding operation in which the folding line passes through the target image region. In response to the first folding operation, magnification processing is performed on the first image to obtain the target image, and at least the region that is on the target image and that is corresponding to the target image region is displayed on the second screen region. In this case, the first image may still be displayed in the first screen region.

In this embodiment, in response to a modification operation performed by the user on the target image, a result of the modification operation is mapped to the first image. In other words, when the user wants to modify the target image region of the first image, it is ensured that the folding line passes through the target image region, and the target image region may be projected onto the folding screen through magnification. In this way, a magnified picture may be modified while a modified effect is views on an original picture, thereby facilitating an operation by the user and improving image processing efficiency.

In an embodiment, the performing magnification processing on the first image to obtain the target image may include: obtaining a degree of an included angle between the folding line of the first folding operation and a first preset direction; obtaining a target magnification multiple according to the degree of the included angle; and performing magnification processing on the first image according to the target magnification multiple to obtain the target image.

The first preset direction may be a direction along an edge of the folding screen. An inclination angle of the folding line may be determined according to a relationship between the folding line and the first preset direction. Folding lines with different inclination angles may correspond to different magnification multiples, for example, the inclination angle of the folding line may be positively correlated with a magnification multiple. Based on this, a correspondence between the degree of the included angle between the folding line and the first preset direction and a magnification multiple may be established in advance, so that after the degree of the included angle between the folding line of the first folding operation and the first preset direction is obtained, the target magnification multiple is determined according to the degree of the included angle based on the pre-established correspondence. Magnification processing is performed on the first image according to the target magnification multiple to obtain the target image.

In an example, folding lines with different inclination angles may correspond to different display positions, and the target image is displayed in a direction in which the folding line is located.

Figure 7:
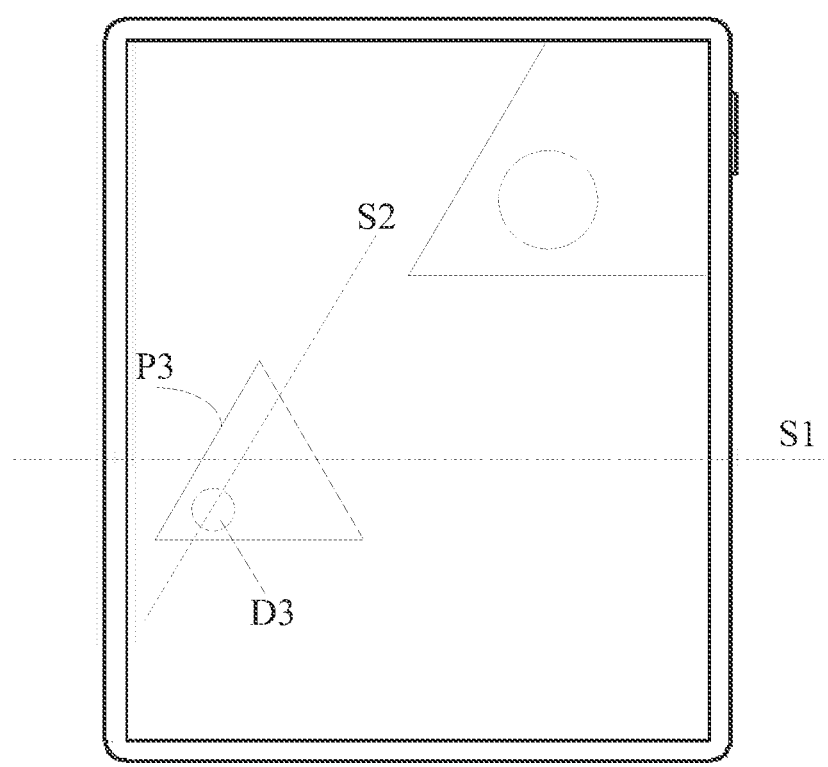
FIG. 7 is a sixth schematic diagram of an interface of a folding screen according to an embodiment of this application.

For example, as shown in FIG. 7, a first image P3 is displayed in a lower left corner of the folding screen, a target image region of the first image P3 is D3, and the first preset direction is a direction S1. If the folding operation passes through the target image region D3 and the folding line is S2, the target magnification multiple is determined according to a degree of an included angle between the folding line S2 and the direction S1, and magnification processing is performed the first image P3 according to the target magnification multiple to obtain the target image. In a direction of the folding line S2, at least a region that is on the target image and that is corresponding to the target image region D3 is displayed on the second screen region.

Figure 8:
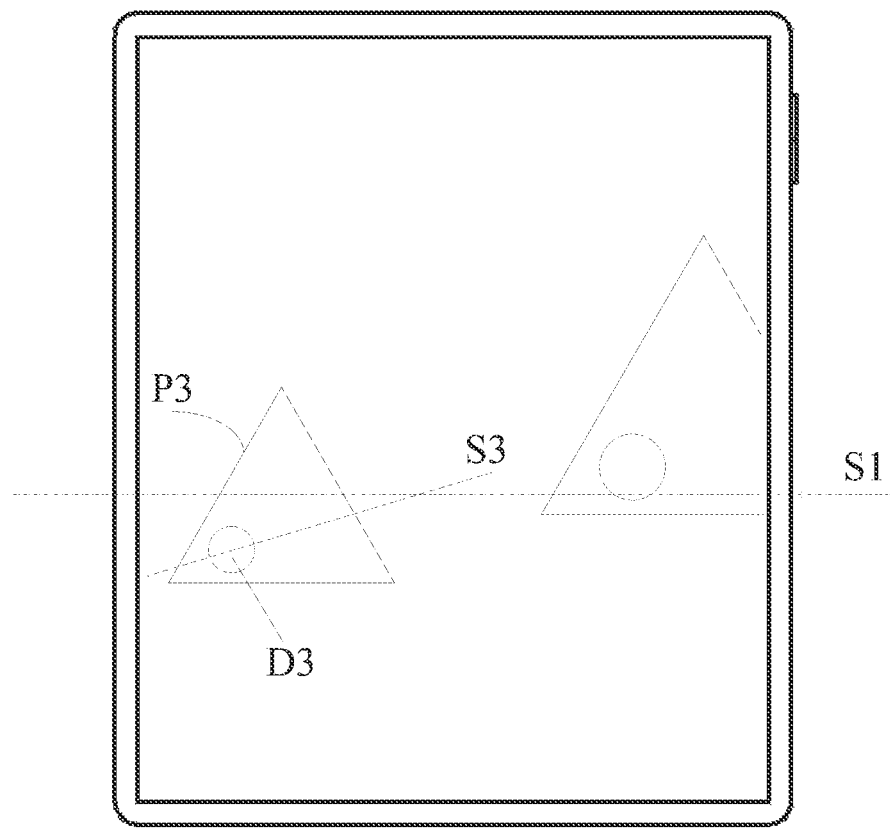
FIG. 8 is a seventh schematic diagram of an interface of a folding screen according to an embodiment of this application.

For example, as shown in FIG. 8, a first image P3 is displayed in a lower left corner of the folding screen, a target image region of the first image P3 is D3, and the first preset direction is a direction S1. If the folding operation passes through the target image region D3 and the folding line is S3, the target magnification multiple is determined according to a degree of an included angle between the folding line S3 and the direction S1, and magnification processing is performed the first image P3 according to the target magnification multiple to obtain the target image. In a direction of the folding line S3, at least a region that is on the target image and that is corresponding to the target image region D3 is displayed on the second screen region.

It can be learned from FIG. 7 and FIG. 8 that, because an inclination angle of the folding line S2 is different from that of the folding line S3, magnification multiples for magnification processing on the first image are different, and display positions of the target image are also different.

In this embodiment of the present disclosure, when the user wants to modify the target image region of the first image, it is ensured that the folding line passes through the target image region and the included angle between the folding line and the first preset direction is adjusted, so that the target image region can be projected onto the folding screen by using a corresponding magnification multiple.

In this embodiment of the present disclosure, a display position of the target image may be determined based on a direction of the folding line. In this way, the first image and a plurality of target images can be simultaneously presented on the folding screen, so that a plurality of persons can separately perform editing and finally perform merging. In this manner, a plurality of users jointly participate in image editing processing, thereby greatly reducing a time required for image modification and improving image processing efficiency and user experience.

In an embodiment, before the receiving a first folding operation performed by a user on the folding screen, a target image region is selected on the first image in response to a selection operation performed by the user on the first image. Then, the user performs the first folding operation on the folding screen, where the first folding operation is a folding operation along a symmetric line of the first image. The processing the first image in response to the first folding operation, to obtain a target image may include: processing a symmetric region of the target image region according to a display effect of the target image region, to obtain the target image.

Figure 9:
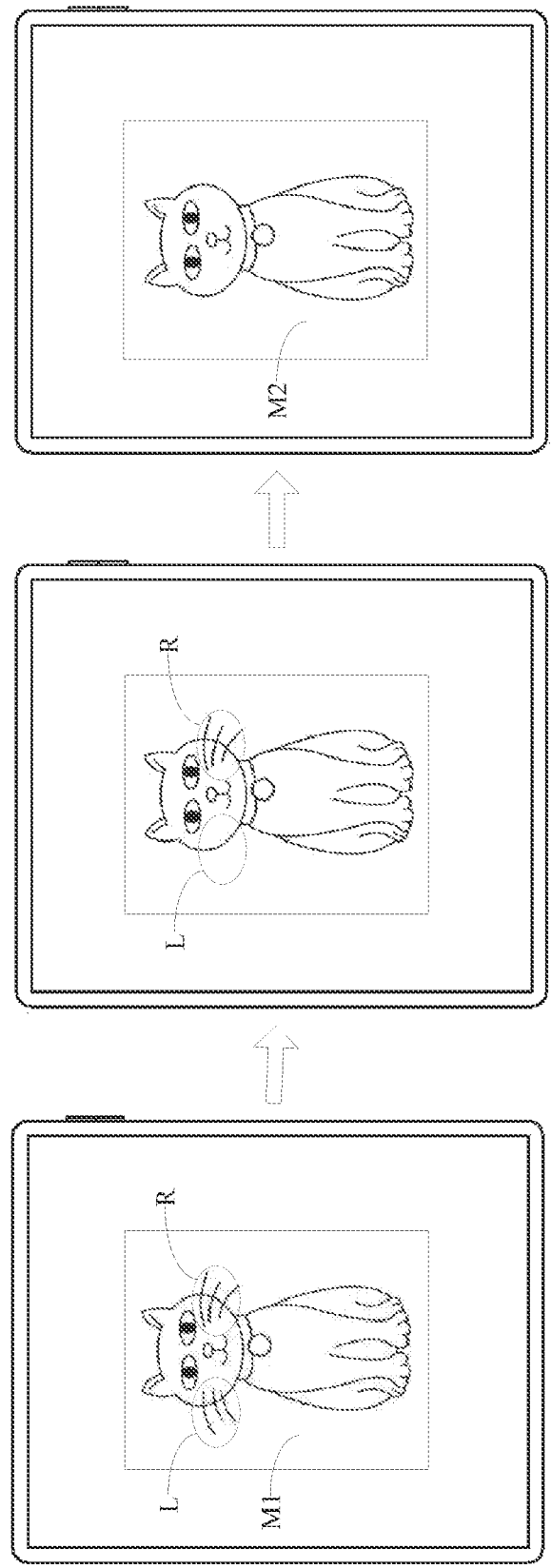
FIG. 9 is an eighth schematic diagram of an interface of a folding screen according to an embodiment of this application.

For example, as shown in FIG. 9, for a first image M1, an image region L on the left side and an image region R on the right side are mutually symmetric regions. The user selects the image region L as the target image region, and modifies the image region L to remove a beard on a left face of a cat. Then, the user performs a folding operation on the folding screen along a symmetric line of the first image M1, and a display effect of the image region L is mapped to the image region R, that is, a beard on a right face of the cat is automatically removed to obtain a final image M2.

In this embodiment of the present disclosure, after a part of an image is modified by means of image symmetry, a modification effect may be mapped to a symmetric part through a folding operation, so that a modification effect of the symmetric part is consistent and beautiful, and a modification operation on the symmetric part is omitted, thereby improving image processing efficiency and user experience.

In an embodiment, after the displaying the target image on the folding screen, the method may further include the following steps:

S4100. Receive a touch operation performed by the user on the first image or the target image.

For example, in a case that the first image is displayed on the folding screen, the touch operation performed by the user on the first image is received. For example, in a case that the target image is displayed on the folding screen, the touch operation performed by the user on the target image is received. For example, in a case that the first image and the target image are displayed on the folding screen, the touch operation performed by the user on the first image or the target image is received.

In this step, the touch operation is used to process an image, and the touch operation may be, for example, an operation such as tapping, double tapping, touching and holding, or sliding. With reference to subsequent steps, first-type processing or second-type processing on the image may be implemented in response to the touch operation input by the user.

S4200. Obtain biometric feature information corresponding to the touch operation.

The biometric feature information may be fingerprint information of the user. That is, the biometric feature information corresponding to the touch operation may be fingerprint information of a finger used to perform the touch operation.

S4300. Perform first-type processing on the first image and the target image in a case that the biometric feature information is first feature information.

S4400. Perform second-type processing on the first image and the target image in a case that the biometric feature information is second feature information.

In this embodiment of the present disclosure, the first feature information may be pre-collected fingerprint information of a finger of the user, or the first feature information may be a group of pre-collected fingerprint information of the user.

The second feature information may be pre-collected fingerprint information of a finger of the user, or the second feature information may be a group of pre-collected fingerprint information of the user. The second feature information is different from the first feature information.

In this embodiment of the present disclosure, the first-type processing is editing processing, and the second-type processing is non-editing processing; or the first-type processing is a non-editing operation, and the second-type processing is an editing operation, or the first-type processing is a set of one or more types of preset processing, and the second-type processing is a set of one or more types of preset processing, where processing in the first-type processing is different from processing in the second-type processing. In this embodiment, the biometric feature information corresponding to the touch operation is obtained, and a processing type is distinguished according to the obtained biometric feature information. When an image is processed, the user does not need to pre-switch an editing tool and a non-editing tool, and the operation is more convenient, thereby improving image processing efficiency and user experience.

In an example, the first feature information may include fingerprint information of each finger of the left hand of the user, and the second feature information may include fingerprint information of each finger of the right hand of the user. In a case that the fingerprint information of the touch operation belongs to the left hand of the user, the first-type processing is performed on the first image and the target image, and in a case that the fingerprint information of the touch operation belongs to the right hand of the user, the second-type processing is performed on the first image and the target image. That is, fingerprints of the two hands of the user may be collected in advance. When processing is performed on any image, the left hand and the right hand may be distinguished, so that one hand is responsible for the first-type processing, and the other hand is responsible for the second-type processing. For example, the left hand is responsible for dragging and scaling an image, and the right hand is responsible for an editing operation on the image. In this way, control manners of the two hands are distinguished, thereby facilitating image processing and improving image processing efficiency.

In another example, the first feature information may include fingerprint information of one finger of the user, and the second feature information may include fingerprint information of another finger of the user. That is, fingerprints of different fingers of the user may be collected in advance. When processing is performed on any image, different fingers may be distinguished, so that one finger is responsible for a first-type operation, and the other finger is responsible for a second-type operation. For example, the index finger and the middle finger may be distinguished, an operation instruction of the middle finger may control dragging and scaling of an image, and an operation instruction of the index finger may control editing of the image. In this way, control manners of fingers are distinguished, so that more operation manners can be provided for the user, thereby facilitating image processing and improving image processing efficiency.

According to the image processing method provided in this embodiment of this application, in a case that a first image is displayed on a folding screen, the first image is processed in response to a first folding operation performed by a user on the folding screen, to obtain a target image, and the target image is displayed on the folding screen. Foldability of the folding screen is used in an image processing process, thereby helping the user more conveniently and accurately process an image and improving user experience.

It should be noted that the image processing method provided in the embodiments of this application may be performed by an image processing apparatus, or a control module that is in the image processing apparatus and that is configured to perform the image processing method. In the embodiments of this application, that the image processing apparatus performs and loads the image processing method is used as an example to describe the image processing method provided in the embodiments of this application.

Figure 10:
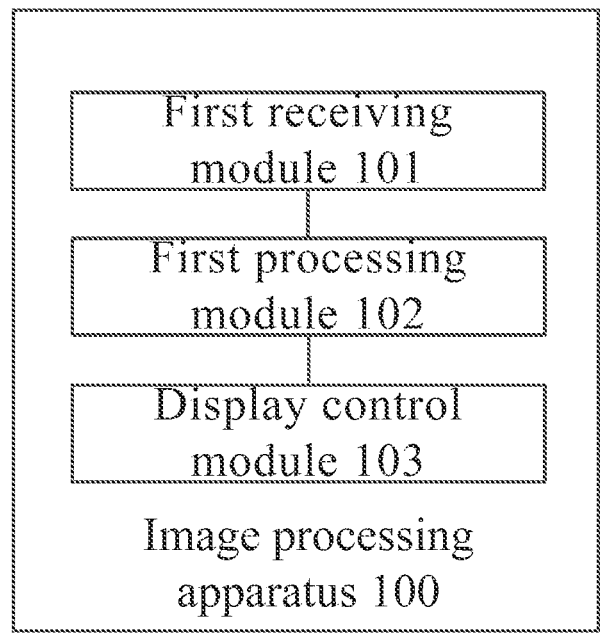
FIG. 10 is a schematic structural diagram of an image processing apparatus according to an embodiment of this application.

Corresponding to the foregoing embodiment, referring to FIG. 10, an embodiment of this application further provides an image processing apparatus. An image processing apparatus 100 includes a first receiving module 101, a first processing module 102, and a display control module 103.

The first receiving module 101 is configured to: in a case that a first image is displayed on the folding screen, receive a first folding operation performed by a user on the folding screen; the first processing module 102 is configured further to process the first image in response to the first folding operation, to obtain a target image, and the display control module 103 is configured to display the target image on the folding screen.

In an embodiment, the apparatus further includes: a second receiving module, configured to receive a touch operation performed by the user on the first image or the target image, a first obtaining module, configured to obtain biometric feature information corresponding to the touch operation; a second processing module, configured to perform first-type processing on the first image and the target image in a case that the biometric feature information is first feature information; and a third processing module, configured to perform second-type processing on the first image and the target image in a case that the biometric feature information is second feature information.

In an embodiment, a second image is further displayed on the folding screen, and the second image is an image obtained by performing copy processing or mirroring processing on the first image; and the apparatus further includes, a first selection module, configured to: select a first image region on the first image in response to a selection operation performed by the user on the first image; and select a second image region on the second image in response to a selection operation performed by the user on the second image, where image content corresponding to the first image region is different from that corresponding to the second image region; and a first modifying module, configured to: modify the first image region in response to a modification operation performed by the user on the first image region, to obtain a modified first image; and modify the second image region in response to a modification operation performed by the user on the second image region, to obtain a modified second image: and when processing the first image in response to the first folding operation, to obtain the target image, the first processing module 102 may be configured to merge the modified first image and the modified second image in response to the first folding operation, to obtain the target image.

In an embodiment, a second image is further displayed on the folding screen, and the second image is an image obtained by performing copy processing or mirroring processing on the first image; and the apparatus further includes: a second selection module, configured to select a merged region and a locked region on the first image in response to a selection operation performed by the user on the first image; and a second modifying module, configured to obtain a modified second image in response to a modification operation performed by the user on the second image; and when processing the first image in response to the first folding operation, to obtain the target image, the first processing module 102 may be configured to merge image content of a third image region of the modified second image into the first image in response to the first folding operation, to obtain the target image, where the third image region is an image region corresponding to the merged region in the modified second image.

In an embodiment, the folding screen includes a first screen region for displaying the first image and a second screen region other than the first image, and the first folding operation is a folding operation in which a folding line passes through a target image region, and when processing the first image to obtain the target image, the first processing module 102 may be configured to perform magnification processing on the first image to obtain the target image.

When displaying the target image on the folding screen, the display control module 103 may be configured to display, on the second screen region, at least a region that is on the target image and that is corresponding to the target image region.

In an embodiment, when performing magnification processing on the first image to obtain the target image, the first processing module 102 may include: an included angle obtaining unit, configured to obtain a degree of an included angle between the folding line of the first folding operation and a first preset direction; a magnification multiple obtaining unit, configured to obtain a target magnification multiple according to the degree of the included angle; and an image magnification unit, configured to perform magnification processing on the first image according to the target magnification multiple to obtain the target image.

In an embodiment, the apparatus further includes: a third selection module, configured to select a target image region on the first image in response to a selection operation performed by the user on the first image. The first folding operation is a folding operation along a symmetric line of the first image, and when processing the first image to obtain the target image, the first processing module 102 may be configured to process a symmetric region of the target image region according to a display effect of the target image region, to obtain the target image.

According to the image processing apparatus provided in this embodiment of this application, in a case that a first image is displayed on a folding screen, the first image is processed in response to a first folding operation performed by a user on the folding screen, to obtain a target image, and the target image is displayed on the folding screen. Foldability of the folding screen is used in an image processing process, thereby helping the user more conveniently and accurately process an image and improving user experience.

The image processing apparatus in this embodiment of this application may be an apparatus, or may be a component, an integrated circuit, or a chip in a terminal. The apparatus may be a mobile electronic device. For example, the mobile electronic device may be a mobile phone, a tablet computer, a notebook computer, a palmtop computer, an in-vehicle electronic device, a wearable device, an Ultra-Mobile Personal Computer (UMPC), a netbook, or a Personal Digital Assistant (PDA). This is not specifically limited in this embodiment of this application.

The image processing apparatus in this embodiment of this application may be an apparatus with an operating system. The operating system may be an Android operating system, an iOS operating system, or another possible operating system. This is not specifically limited in this embodiment of this application.

The image processing apparatus provided in this embodiment of this application can implement the processes implemented in the method embodiments in FIG. 1 to FIG. 9. To avoid repetition, details are not described herein again.

Figure 11:
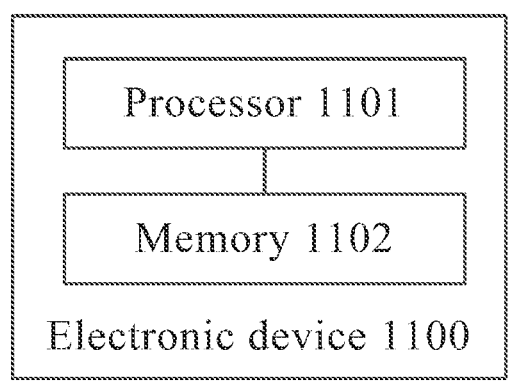
FIG. 11 is a first schematic structural diagram of hardware of an electronic device according to an embodiment of this application.

Corresponding to the foregoing embodiment, for example, referring to FIG. 11, an embodiment of this application further provides an electronic device 1100, including a processor 1101, a memory 1102, and a program or an instruction that is stored in the memory 1102 and that can be run on the processor 1101. The program or the instruction is executed by the processor 1101 to implement the processes of the foregoing image processing method embodiment and a same technical effect can be achieved. To avoid repetition, details are not described herein again.

It should be noted that the electronic device in this embodiment of this application may include the foregoing mobile electronic device.

Figure 12:
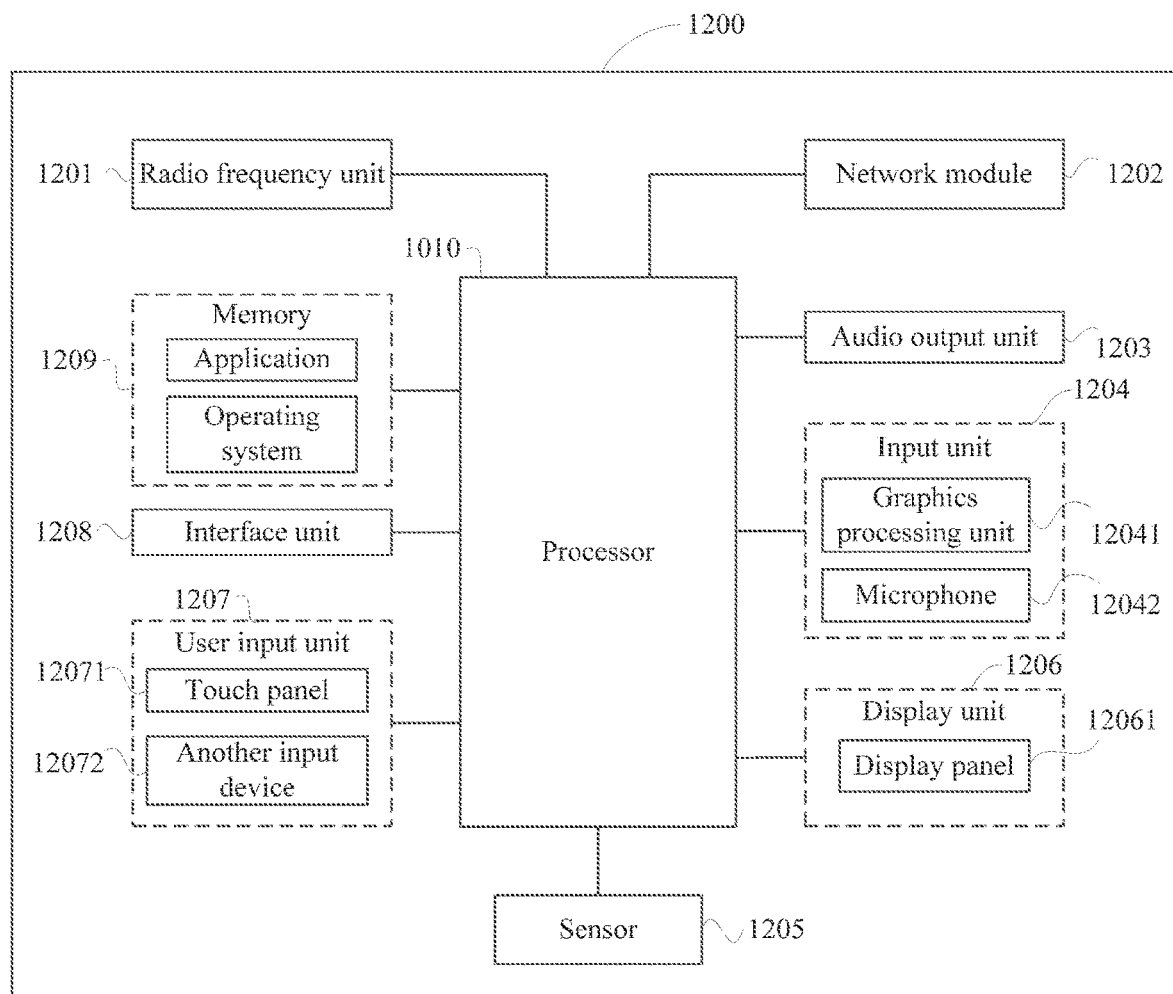
FIG. 12 is a second schematic structural diagram of hardware of an electronic device according to an embodiment of this application.

FIG. 12 is a schematic structural diagram of hardware of an electronic device according to an embodiment of this application.

An electronic device 1200 includes but is not limited to components such as a radio frequency unit 1201, a network module 1202, an audio output unit 1203, an input unit 1204, a sensor 1205, a display unit 1206, a user input unit 1207, an interface unit 1208, a memory 1209, and a processor 1210.

A person skilled in the art can understand that the electronic device 1200 may further include a power supply (such as a battery) that supplies power to each component. The power supply may be logically connected to the processor 1210 by using a power supply management system, to implement functions such as charging and discharging management, and power consumption management by using the power supply management system. The structure of the electronic device shown in FIG. 12 does not constitute a limitation on the electronic device. The electronic device may include components more or fewer than those shown in the diagram, a combination of some components, or different component arrangements. Details are not described herein.

The processor 1210 is configured to: in a case that a first image is displayed on the folding screen, receive a first folding operation performed by a user on the folding screen; and process the first image in response to the first folding operation, to obtain a target image; and the display unit 1206 is configured to display the target image on the folding screen.

In an embodiment, after displaying the target image on the folding screen, the processor 1210 is further configured to: receive a touch operation performed by the user on the first image or the target image; obtain biometric feature information corresponding to the touch operation; perform first-type processing on the first image and the target image in a case that the biometric feature information is first feature information; and perform second-type processing on the first image and the target image in a case that the biometric feature information is second feature information.

In an embodiment, a second image is further displayed on the folding screen, and the second image is an image obtained by performing copy processing or mirroring processing on the first image, and before receiving the first folding operation performed by the user on the folding screen, the processor 1210 is further configured to: select a first image region on the first image in response to a selection operation performed by the user on the first image; select a second image region on the second image in response to a selection operation performed by the user on the second image, where image content corresponding to the first image region is different from that corresponding to the second image region; modify the first image region in response to a modification operation performed by the user on the first image region, to obtain a modified first image; and modify the second image region in response to a modification operation performed by the user on the second image region, to obtain a modified second image. When processing the first image to obtain the target image, the processor 1210 may be configured to merge the modified first image and the modified second image in response to the first folding operation, to obtain the target image.

In an embodiment, a second image is further displayed on the folding screen, and the second image is an image obtained by performing copy processing or mirroring processing on the first image, and before receiving the first folding operation performed by the user on the folding screen, the processor 1210 is further configured to: select a merged region and a locked region on the first image in response to a selection operation performed by the user on the first image; and obtain a modified second image in response to a modification operation performed by the user on the second image. When processing the first image to obtain the target image, the processor 1210 may be configured to merge image content of a third image region of the modified second image into the first image in response to the first folding operation, to obtain the target image, where the third image region is an image region corresponding to the merged region in the modified second image.

In an embodiment, the folding screen includes a first screen region for displaying the first image and a second screen region other than the first image; and the first folding operation is a folding operation in which a folding line passes through a target image region; and when processing the first image to obtain the target image, the processor 1210 may be configured to perform magnification processing on the first image to obtain the target image, and when displaying the target image on the folding screen, the display unit 1206 may be configured to display, on the second screen region, at least a region that is on the target image and that is corresponding to the target image region.

In an embodiment, when performing magnification processing on the first image to obtain the target image, the processor 1210 may be configured to: obtain a degree of an included angle between the folding line of the first folding operation and a first preset direction, obtain a target magnification multiple according to the degree of the included angle; and perform magnification processing on the first image according to the target magnification multiple to obtain the target image.

In an embodiment, before receiving the first folding operation performed by the user on the folding screen, the processor 1210 is further configured to select a target image region on the first image in response to a selection operation performed by the user on the first image. The first folding operation is a folding operation along a symmetric line of the first image, and when processing the first image to obtain the target image, the processor 1210 may be configured to process a symmetric region of the target image region according to a display effect of the target image region, to obtain the target image.

According to the electronic device provided in this embodiment of this application, the electronic device has a folding screen, and in a case that a first image is displayed on the folding screen, the first image is processed in response to a first folding operation performed by a user on the folding screen, to obtain a target image, and the target image is displayed on the folding screen. Foldability of the folding screen is used in an image processing process, thereby helping the user more conveniently and accurately process an image and improving user experience.

The electronic device provided in this embodiment of this application can implement the processes of the image processing method in the foregoing method embodiment and can achieve a same technical effect. To avoid repetition, details are not described herein again.

It should be understood that, in this embodiment of this application, the input unit 1204 may include a Graphics Processing Unit (GPU) 12041 and a microphone 12042, and the graphics processing unit 12041 processes image data of a still picture or a video obtained by an image capture apparatus (such as a camera) in a video capture mode or an image capture mode. The display unit 1206 may include a display panel 12061. In some embodiments, the display panel 12061 may be configured in a form such as a liquid crystal display or an organic light-emitting diode. The user input unit 1207 includes a touch panel 12071 and another input device 12072. The touch panel 12071 is also referred to as a touchscreen. The touch panel 12071 may include two parts: a touch detection apparatus and a touch controller. The another input device 12072 may include but is not limited to a physical keyboard, a functional button (such as a volume control button or a power on/off button), a trackball, a mouse, and a joystick. Details are not described herein. The memory 1209 may be configured to store a software program and various data, including but not limited to an application and an operating system. An application processor and a modem processor may be integrated into the processor 1210, the application processor mainly processes an operating system, a user interface, an application, and the like, and the modem processor mainly processes wireless communication. It can be understood that, in some alternative embodiments, the modem processor may not be integrated into the processor 1210.

In this embodiment of the present disclosure, the display panel 12061 and the touch panel 12071 are superposed together to construct the folding screen in this embodiment of the present disclosure.

An embodiment of this application further provides a readable storage medium. The readable storage medium stores a program or an instruction, and the program or the instruction is executed by a processor to implement the processes of the foregoing image processing method embodiment and a same technical effect can be achieved. To avoid repetition, details are not described herein again.

The processor is a processor in the electronic device in the foregoing embodiment. The readable storage medium includes a computer-readable storage medium, such as a computer Read-Only Memory (ROM), a Random Access Memory (RAM), a magnetic disk, or an optical disc.

An embodiment of this application further provides a chip. The chip includes a processor and a communication interface, the communication interface is coupled to the processor, and the processor is configured to run a program or an instruction to implement the processes of the foregoing image processing method embodiment, and a same technical effect can be achieved. To avoid repetition, details are not described herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

Based on the descriptions of the foregoing implementations, a person skilled in the art may clearly understand that the method in the foregoing embodiment may be implemented by software in addition to a necessary universal hardware platform or by hardware only. In some embodiments, the technical solutions of this application entirely or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of this application.

The embodiments of this application are described above with reference to the accompanying drawings, but this application is not limited to the above implementations, and the above implementations are only illustrative and not restrictive. Under the enlightenment of this application, those of ordinary skill in the art can make many forms without departing from the purpose of this application and the protection scope of the claims, all of which fall within the protection of this application.

The invention claimed is:

1. An image processing method, performed by an electronic device comprising a folding screen, comprising:
   when a first image is displayed on the folding screen of the electronic device, receiving a first folding operation performed by a user on the folding screen;
   processing the first image in response to the first folding operation, to obtain a target image;
   displaying the target image on the folding screen;
   receiving a touch operation performed by the user on the first image or the target image;
   obtaining biometric feature information corresponding to the touch operation;
   performing first-type processing on the first image and the target image when the biometric feature information is first feature information; and
   performing second-type processing on the first image and the target image when the biometric feature information is second feature information,
   wherein:
   the first-type processing is editing processing, and the second-type processing is a non-editing processing; or
   the first-type processing is the non-editing operation, and the second-type processing is the editing operation; or
   the first-type processing is a set of one or more types of preset processing, and the second-type processing is another set of one or more types of preset processing, wherein the first-type processing is different from the second-type processing.

2. The image processing method according to claim 1, wherein:
   a second image is further displayed on the folding screen, and the second image is an image obtained by performing copy processing or mirroring processing on the first image;
   before the receiving a first folding operation performed by a user on the folding screen, the method further comprises:
   selecting a first image region on the first image in response to a selection operation performed by the user on the first image, and selecting a second image region on the second image in response to a selection operation performed by the user on the second image, wherein image content corresponding to the first image region is different from that corresponding to the second image region, and
   modifying the first image region in response to a modification operation performed by the user on the first image region, to obtain a modified first image, and modifying the second image region in response to a modification operation performed by the user on the second image region, to obtain a modified second image; and
   the processing the first image in response to the first folding operation, to obtain a target image comprises:
   merging the modified first image and the modified second image in response to the first folding operation, to obtain the target image.

3. The image processing method according to claim 1, wherein:
   a second image is further displayed on the folding screen, and the second image is an image obtained by performing copy processing or mirroring processing on the first image;
   before the receiving a first folding operation performed by a user on the folding screen, the method further comprises:
   selecting a merged region and a locked region on the first image in response to a selection operation performed by the user on the first image, and
   obtaining a modified second image in response to a modification operation performed by the user on the second image; and
   the processing the first image in response to the first folding operation, to obtain a target image comprises:
   merging image content of a third image region of the modified second image into the first image in response to the first folding operation, to obtain the target image, wherein the third image region is an image region corresponding to the merged region in the modified second image.

4. The image processing method according to claim 1, wherein:
   the folding screen comprises a first screen region for displaying the first image and a second screen region other than the first image;
   the first folding operation is a folding operation in which a folding line passes through a target image region, and the processing the first image to obtain a target image comprises: performing magnification processing on the first image to obtain the target image; and
   the displaying the target image on the folding screen comprises: displaying, on the second screen region, at least a region that is on the target image and that is corresponding to the target image region.

5. The image processing method according to claim 4, wherein the performing magnification processing on the first image to obtain the target image comprises:
   obtaining a degree of an included angle between the folding line of the first folding operation and a first preset direction;
   obtaining a target magnification multiple according to the degree of the included angle; and
   performing magnification processing on the first image according to the target magnification multiple to obtain the target image.

6. The image processing method according to claim 1, wherein before the receiving a first folding operation performed by a user on the folding screen, the method further comprises:

selecting a target image region on the first image in response to a selection operation performed by the user on the first image; and the first folding operation is a folding operation along a symmetric line of the first image, and the processing the first image to obtain a target image comprises:

processing a symmetric region of the target image region according to a display effect of the target image region, to obtain the target image.

7. An electronic device, comprising: a folding screen; a processor;

and a memory having a computer program or an instruction stored thereon, wherein the computer program or the instruction, when executed by the processor, causes the processor to implement operations, comprising:

when a first image is displayed on the folding screen of the electronic device, receiving a first folding operation performed by a user on the folding screen;

processing the first image in response to the first folding operation, to obtain a target image;

displaying the target image on the folding screen;

receiving a touch operation performed by the user on the first image or the target image;

obtaining biometric feature information corresponding to the touch operation;

performing first-type processing on the first image and the target image when the biometric feature information is first feature information; and performing second-type processing on the first image and the target image when the biometric feature information is second feature information, wherein:

the first-type processing is editing processing, and the second-type processing is non-editing processing; or the first-type processing is the non-editing processing, and the second-type processing is the editing processing; or the first-type processing is a set of one or more types of preset processing, and the second-type processing is another set of one or more types of preset processing, wherein the first-type processing is different from the second-type processing.

8. The electronic device according to claim 7, wherein:

a second image is further displayed on the folding screen, and the second image is an image obtained by performing copy processing or mirroring processing on the first image;

before the receiving a first folding operation performed by a user on the folding screen, the operations further comprise:

selecting a first image region on the first image in response to a selection operation performed by the user on the first image, and selecting a second image region on the second image in response to a selection operation performed by the user on the second image, wherein image content corresponding to the first image region is different from that corresponding to the second image region, and modifying the first image region in response to a modification operation performed by the user on the first image region, to obtain a modified first image, and modifying the second image region in response to a modification operation performed by the user on the second image region, to obtain a modified second image; and the processing the first image in response to the first folding operation, to obtain a target image comprises:

merging the modified first image and the modified second image in response to the first folding operation, to obtain the target image.

9. The electronic device according to claim 7, wherein:

a second image is further displayed on the folding screen, and the second image is an image obtained by performing copy processing or mirroring processing on the first image;

before the receiving a first folding operation performed by a user on the folding screen, the operations further comprise:

selecting a merged region and a locked region on the first image in response to a selection operation performed by the user on the first image, and obtaining a modified second image in response to a modification operation performed by the user on the second image; and the processing the first image in response to the first folding operation, to obtain a target image comprises:

merging image content of a third image region of the modified second image into the first image in response to the first folding operation, to obtain the target image, wherein the third image region is an image region corresponding to the merged region in the modified second image.

10. The electronic device according to claim 7, wherein:

the folding screen comprises a first screen region for displaying the first image and a second screen region other than the first image;

the first folding operation is a folding operation in which a folding line passes through a target image region, and the processing the first image to obtain a target image comprises: performing magnification processing on the first image to obtain the target image; and the displaying the target image on the folding screen comprises: displaying, on the second screen region, at least a region that is on the target image and that is corresponding to the target image region.

11. The electronic device according to claim 10, wherein the performing magnification processing on the first image to obtain the target image comprises:

obtaining a degree of an included angle between the folding line of the first folding operation and a first preset direction;

obtaining a target magnification multiple according to the degree of the included angle; and performing magnification processing on the first image according to the target magnification multiple to obtain the target image.

12. The electronic device according to claim 7, wherein before the receiving a first folding operation performed by a user on the folding screen, the operations further comprise:

selecting a target image region on the first image in response to a selection operation performed by the user on the first image; and the first folding operation is a folding operation along a symmetric line of the first image, and the processing the first image to obtain a target image comprises:

processing a symmetric region of the target image region according to a display effect of the target image region, to obtain the target image.

13. A non-transitory computer-readable storage medium storing a computer program or an instruction that, when executed by a processor, causes the processor to implement operations comprising:
   when a first image is displayed on a folding screen of an electronic device, receiving a first folding operation performed by a user on the folding screen;
   processing the first image in response to the first folding operation, to obtain a target image; and
   displaying the target image on the folding screen;
   receiving a touch operation performed by the user on the first image or the target image;
   obtaining biometric feature information corresponding to the touch operation;
   performing first-type processing on the first image and the target image when the biometric feature information is first feature information; and
   performing second-type processing on the first image and the target image when the biometric feature information is second feature information,
   wherein:
   the first-type processing is editing processing, and the second-type processing is non-editing processing; or
   the first-type processing is the non-editing processing, and the second-type processing is the editing processing; or
   the first-type processing is a set of one or more types of preset processing, and the second-type processing is another set of one or more types of preset processing, wherein the first-type processing is different from the second-type processing.

14. The non-transitory computer-readable storage medium according to claim 13,
   wherein:
   a second image is further displayed on the folding screen, and the second image is an image obtained by performing copy processing or mirroring processing on the first image;
   before the receiving a first folding operation performed by a user on the folding screen, the operations further comprise:
   selecting a first image region on the first image in response to a selection operation performed by the user on the first image, and selecting a second image region on the second image in response to a selection operation performed by the user on the second image, wherein image content corresponding to the first image region is different from that corresponding to the second image region, and
   modifying the first image region in response to a modification operation performed by the user on the first image region, to obtain a modified first image, and modifying the second image region in response to a modification operation performed by the user on the second image region, to obtain a modified second image; and
   the processing the first image in response to the first folding operation, to obtain a target image comprises:
   merging the modified first image and the modified second image in response to the first folding operation, to obtain the target image.

15. The non-transitory computer-readable storage medium according to claim 13,
   wherein:
   a second image is further displayed on the folding screen, and the second image is an image obtained by performing copy processing or mirroring processing on the first image;
   before the receiving a first folding operation performed by a user on the folding screen, the operations further comprise:
   selecting a merged region and a locked region on the first image in response to a selection operation performed by the user on the first image, and obtaining a modified second image in response to a modification operation performed by the user on the second image; and
   the processing the first image in response to the first folding operation, to obtain a target image comprises:
   merging image content of a third image region of the modified second image into the first image in response to the first folding operation, to obtain the target image, wherein the third image region is an image region corresponding to the merged region in the modified second image.

16. The non-transitory computer-readable storage medium according to claim 13,
   wherein:
   the folding screen comprises a first screen region for displaying the first image and a second screen region other than the first image;
   the first folding operation is a folding operation in which a folding line passes through a target image region, and the processing the first image to obtain a target image comprises: performing magnification processing on the first image to obtain the target image; and
   the displaying the target image on the folding screen comprises: displaying, on the second screen region, at least a region that is on the target image and that is corresponding to the target image region.

17. The non-transitory computer-readable storage medium according to claim 16, wherein the performing magnification processing on the first image to obtain the target image comprises:
   obtaining a degree of an included angle between the folding line of the first folding operation and a first preset direction;
   obtaining a target magnification multiple according to the degree of the included angle; and
   performing magnification processing on the first image according to the target magnification multiple to obtain the target image.

* * * * *